(12) United States Patent
Moghnie

(10) Patent No.: US 6,330,319 B1
(45) Date of Patent: Dec. 11, 2001

(54) SYSTEM AND METHOD FOR ADDING SERVICES TO COMPUTER TELEPHONE SYSTEMS

(75) Inventor: Hassan Mostapha Moghnie, Newport Beach, CA (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/221,631

(22) Filed: Dec. 23, 1998

(51) Int. Cl.[7] ................................................. H04M 3/42
(52) U.S. Cl. .............................. 379/201.03; 379/207.02
(58) Field of Search .......................... 379/201.01, 201.03, 379/201.12, 207.02

(56) References Cited

U.S. PATENT DOCUMENTS

| | | |
|---|---|---|
| 4,747,127 | 5/1988 | Hansen et al. . |
| 5,375,241 | 12/1994 | Walsh .................................. 395/700 |
| 5,802,159 | 9/1999 | Smolentzov et al. . |
| 5,802,367 | 9/1998 | Held et al. ........................... 395/685 |
| 5,920,618 * | 7/1999 | Fleischer, III et al. .............. 379/201 |
| 6,002,756 | 12/1999 | Lo et al. ............................... 379/201 |

FOREIGN PATENT DOCUMENTS

WO 95/17063   6/1995   (WO) .
WO 95/34175   12/1995  (WO) .
WO 95/34980   12/1995  (WO) .

OTHER PUBLICATIONS

PCT International Search Report for PCT/US99/30940, Apr. 17, 2000.

* cited by examiner

Primary Examiner—Creighton Smith
(74) Attorney, Agent, or Firm—Jenkens & Gilchrist, P.C.

(57) ABSTRACT

A computer-based telephone integration system for providing various telephone-related services is disclosed. The computer-based telephone integration system includes a processing unit and memory storing system software. The system software includes a control object for determining call information pertaining to an incoming telephone call and for searching for a service object to perform a telephone service corresponding to the determined call information, and a plurality of service objects, each of which defines the behavior of a telephone service. The computer-based telephone integration system includes a database which, in response to the determined call information, provides an identification of a link library having therein the service object corresponding to the desired telephone service to perform. Subsequent to accessing the identified link library by the control object, the service object is executed, thereby providing the desired telephone service to the caller.

37 Claims, 3 Drawing Sheets

SYSTEM AND METHOD FOR ADDING SERVICES TO COMPUTER TELEPHONE SYSTEMS

BACKGROUND OF THE INVENTION

1. Technical Field of the Invention

The present invention relates, in general terms, to a system and method for adding a new service to a computer-based telephone integration system, and in particular to a system and method of self-registering objects for creating telephone services within a computer telephony system.

2. Background and Objects of the Invention

Current computer telephony integration (CTI) systems provide various telephone services to a caller based upon information pertaining thereto. For instance, the telephone service provided to a caller may vary depending upon the time or date of the call, the direct inward dialing (DID) number, or the automatic number identification (ANI). One challenge in providing a number of different telephone services pertains to the fact that occasionally new or updated telephone services need to be added to the CTI system. For one type of CTI system, definitions for all of the telephone services are maintained in a single executable file. Consequently, the CTI system must be temporarily shut down in order to substitute a new executable file (having new or updated telephone services) for the old executable file.

A second type of CTI system maintains the behavior of services in a storage medium which contains a file for each behavior in a non-procedural language. Although this system may be updated more easily than the first type of telephone service, this second type of telephone service is noticeably slower than systems which employ service description modules written in a procedural language. As a result, there is a need for efficiently operating a computer-based telephone integration system to which new or updated services may be easily added.

It is an object of the present invention to provide a CTI system in which new or updated telephone services may be added without temporarily shutting down the CTI system.

It is another object of the present invention to provide such a CTI system which employs object inheritance and late binding in adding new telephone services.

SUMMARY OF THE INVENTION

The present invention overcomes the shortcomings in existing computer-based telephone integration systems and satisfies a significant need for a computer-based telephone integration system in which service performance during service updates is substantially seamless.

According to a preferred embodiment of the present invention, there is provided a computer-based telephone integration system having a control module or object which provides the basic call handling routines and a plurality of service modules or objects. A configuration database is included to identify in which of a plurality of dynamic link libraries (DLLs) the appropriate service object is located.

To locate and execute a service object for performing a particular telephone service, the control object utilizes information pertaining to an incoming call, such as the direct inward dialing (DID) telephone number and/or the automatic number identification (ANI), to query the configuration database. In response thereto, the configuration database identifies in which DLL the appropriate service object is located. The control object thereafter performs a call function on the DLL and obtains a pointer to the appropriate service object therewithin. The service object is then executed to create the desired service.

By utilizing the concepts of polymorphism and late binding of the service object to create and provide the desired service, the control object can call functions which are defined by thereby but are implemented in a service object. As a result, new objects may be added to the present CTI system without having to first shut the present CTI system down.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
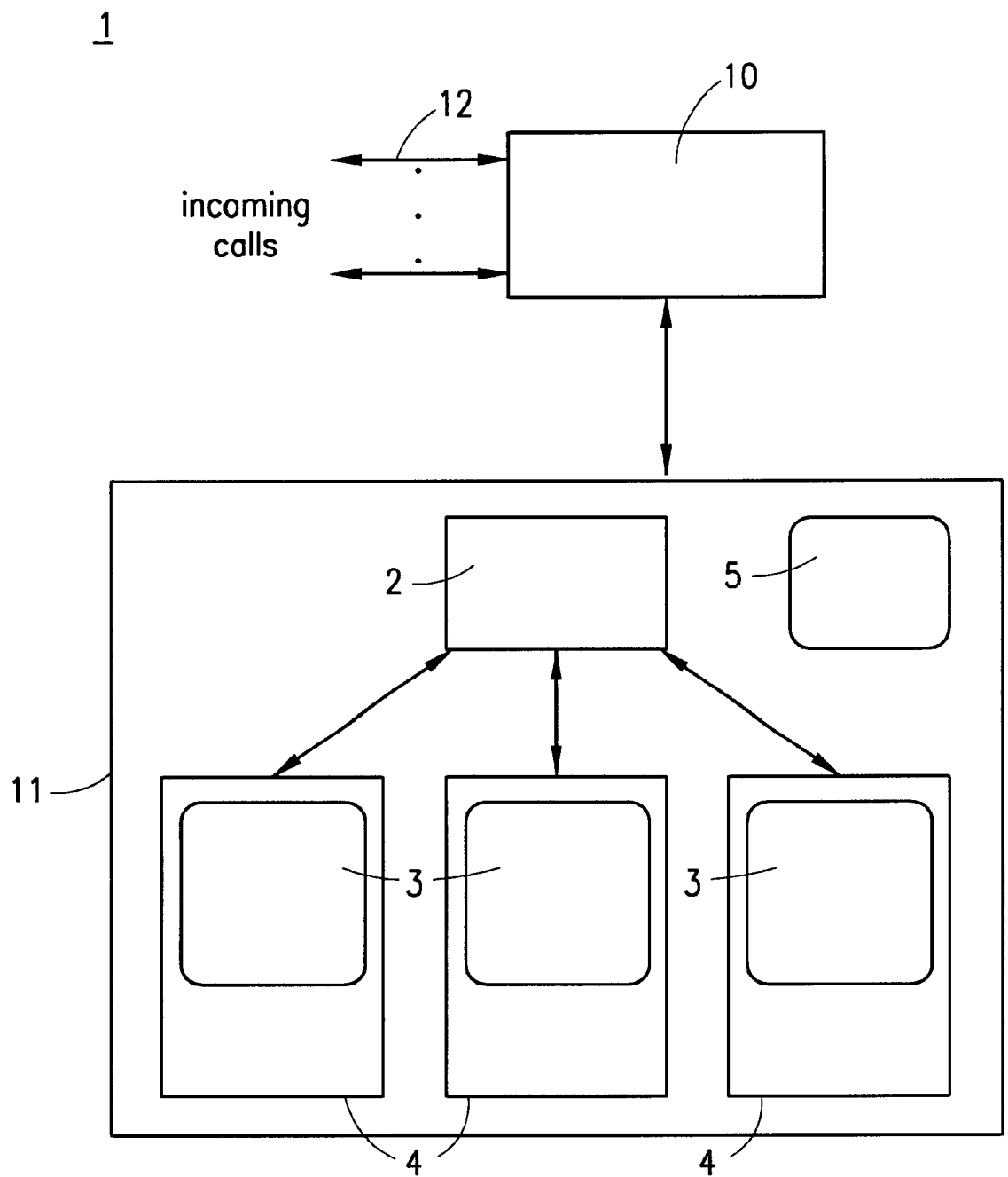
FIG. 1 is a block diagram of the present invention.
Figure 2:
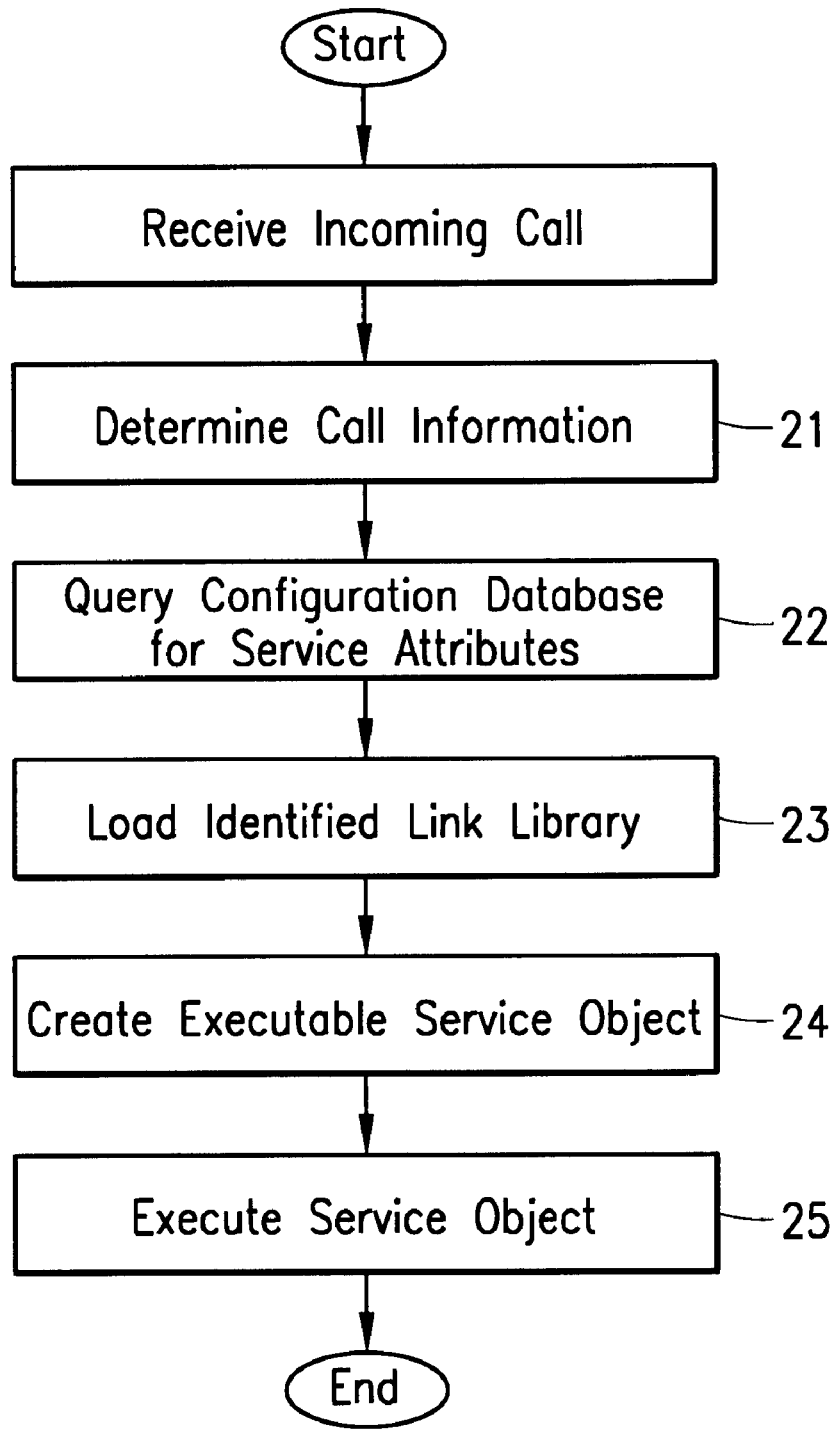
FIG. 2 is a flow chart illustrating the operation of the present invention.

Referring to FIGS. 1 and 2, there is shown a computer-based telephone integration or CTI system 1 according to a preferred embodiment of the present invention. CTI system 1 includes a processing unit 10 and memory 11. Processing unit 10 is coupled to telephone lines 12 over which telephone calls are received. Memory 11 preferably stores system software which is used in conjunction with processing unit 10 to provide telephone-related services to callers of CTI system 1.

System software of CTI system 1 is preferably object-oriented software, including a control module or object 2 which forms an abstract base class for actual service objects. Control object 2 defines telephone services in very general terms without defining the specific operations which are carried out in performing the telephone services. Control object 2 cooperates with processing unit 10 in monitoring inbound telephone lines 12 for a call and determining various characteristics thereof so that the appropriate telephone service is provided to the caller. For example, control object 2 may determine the DID, ANI, the time of day of the incoming call, the day of the week of the incoming call, etc. These determined call characteristics are utilized to identify the appropriate telephone service to perform for the caller.

CTI system 1 preferably further includes a plurality of service modules or objects 3, each of which defines the behavior of a distinct telephone service. Service objects 3 preferably form derived or service classes of objects which are derived from the abstract call control module. A selected service object 3 preferably inherits the characteristics and operation of control object 2. Control object 2 and service objects 3 form a dynamic or late binding system in which particular service objects 3 are not identified for execution until a telephone service is needed to be performed.

Each service object 3 preferably resides in a dynamic link library (DLL) 4. A DLL 4 is utilized to link control object 2 with a suitable service object 3 in order to perform a specific telephone service. A DLL 4, in addition to including a service object 3, is capable of providing an entry point thereto for accessing service object 3 by control object 2. Although a plurality of service objects 3 may reside in the same DLL 4, a DLL 4 is described below as having a single service object 3 for reasons of simplicity.

The present CTI system 1 preferably includes a table for identifying the DLL 4 having the appropriate service object 3 for performing a particular telephone service. Configuration database 5 preferably identifies a DLL 4 containing the appropriate service object 3 based upon information pertaining to the incoming call for which a telephone service is to be performed. Upon determining the characteristics of the incoming telephone call, such as the DID, ANI and/or the time and date of the incoming call, control object 2 preferably queries configuration database 5 using the determined telephone call characteristics. In response to the query, control object 2 is provided the DLL 4 containing the appropriate service object 3, together with the string name corresponding thereto.

The operation of the present invention in providing a telephone-related service will be described with reference to FIG. 2. When an incoming telephone call is received by CTI system 1, control object 2 determines call information pertaining to the incoming telephone call at step 21 for use in determining the appropriate telephone service to provide to the caller. Next, control object 2 queries configuration database 5 at step 22 for attributes of the telephone service, such as identification of the particular DLL 4 having the appropriate service object 3 to perform the telephone service, using the determined telephone call information corresponding to the incoming telephone call. Upon reception of the DLL identification and the particular service object name therewithin, control object 2 loads the identified DLL 4 at step 23.

Next, control object 2 invokes a function on the loaded DLL 4 at step 24 which results in a pointer to the appropriate service object 3 within DLL 4 being provided to control object 2. The invoked function, an object factory, is the standard interface for all DLLs 4 which contain a service object 3 and is necessary due to the late binding characteristic of the present invention. In response, the appropriate service object 3 is provided to control object 2. Thereafter, the service object 3 is executed by invoking the RUN [] method thereof, resulting in the telephone service being provided to the caller.

Figure 3:
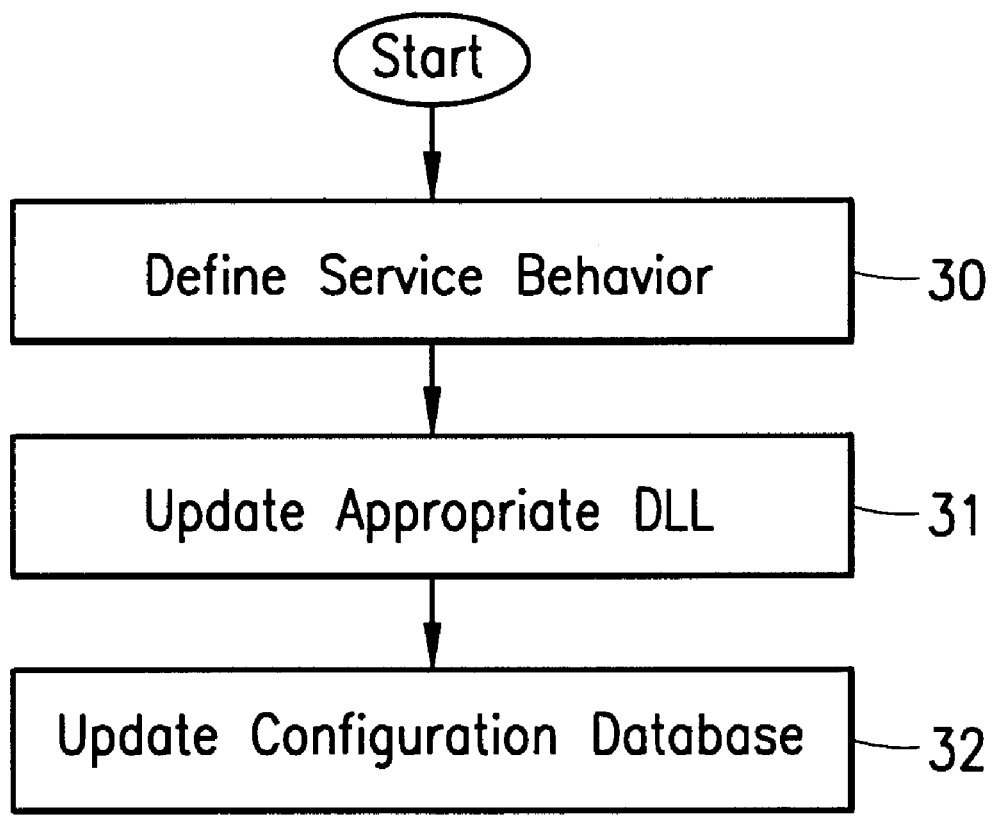
FIG. 3 is a flow chart illustrating the adding of a new telephone service to the present invention.

The present CTI system 1 utilizes late or dynamic binding of control object 2 to an appropriate service object 3 so that new DLLs 4 and/or service objects 3 may be added to CTI system 1 while CTI system 1 is in operation. FIG. 3 illustrates the operation of adding a new DLL 4 to CTI system 1. While CTI system 1 is operating to provide various telephone services, the behavior of the new telephone service to be added is defined in a service object 3 in step 30 and added to a new or existing DLL 4 at step 31. Thereafter, the table information in configuration database 5 is updated at step 32 to reflect the addition. Subsequent queries to configuration database 5 by control object 2 is capable of identifying the newly-defined service object 3 for execution of the corresponding new telephone service.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer program product including a computer readable medium having computer readable program code means embodied thereon, for a computer-based telephone system for providing telephone services to incoming callers thereto, said computer program product comprising:
    first computer readable program code means for determining call information pertaining to an incoming telephone call;
    second computer readable program code means including a database for identifying a service object corresponding to said call information and for identifying a library in which said service object is defined, said service object defining a behavior of a service to be performed in response to said incoming telephone call; and
    third computer readable program code means for executing said service object.

2. The computer program product of claim 1, wherein:
    said call information includes an identification of said incoming telephone call.

3. The computer program product of claim 1, wherein:
    said call information includes an identification of the telephone number called by the caller of said incoming telephone call.

4. The computer program product of claim 1, wherein:
    said call information includes identification of the time said incoming telephone call was received by said computer-based telephone system.

5. The computer program product of claim 1, wherein:
    said first computer readable program code means includes a control object which queries said database for said service object identification, said service object inheriting characteristics of said control object.

6. The computer program product of claim 1, wherein:
    said second computer readable program code means includes a fourth computer readable program code means for invoking an object factory function on said identified service object.

7. A computer program product including a computer readable medium having computer readable program code means embodied thereon, for a computer-based telephone system for providing telephone services to incoming callers thereto, said computer program product comprising:
    first computer readable program code means for determining call information pertaining to an incoming telephone call;
    second computer readable program code means for identifying a service object corresponding to said call information, said service object defining a behavior of a service to be performed in response to said incoming telephone call; and
    third computer readable program code means for executing said service object, said first computer readable program code means, said second computer readable program code means and said third computer readable program code means form a dynamically bound object-oriented system.

8. A method of performing a telephone service for a telephone caller, comprising the steps of:
    receiving an incoming telephone call from the telephone caller;
    determining call information pertaining to said incoming telephone call;

identifying a location of a service object defining the behavior corresponding to a service for the telephone caller, said identifying of said location including querying a database for and receiving therefrom an identification of a library wherein said service object is located and being based upon said call information;

accessing said service object at said location; and executing said service object.

9. The method of claim 8, wherein said accessing step comprises the step of:

accessing said library based upon said identification therefor obtained in querying the database.

10. The method of claim 9, wherein said accessing step further comprises the step of:

performing an object factory function on said library.

11. The method of claim 9, wherein said step of accessing said library comprises the steps of:

loading said library; and operating on said library to receive said service object.

12. A computer-based telephone system for providing various telephone services, comprising:

a processing unit;

memory operatively associated with said processing unit;

a plurality of service objects, each of said plurality of service objects defining a behavior corresponding to a telephone service and being defined within a library;

database means, operatively associated with said memory, for storing locations of said plurality of service objects, said locations of said service objects being provided by said database means based upon call information and including identification of at least one library having said service objects; and system software stored in said memory, said system software cooperating with said processing unit in performing telephone services and including a control object, said control object determining call information pertaining to an incoming telephone call to said computer-based telephone system and requesting an identification of at least one of said service objects to perform a telephone service to the caller of the incoming telephone call, based upon the call information.

13. The computer-based telephone system of claim 12, wherein:

said database means further provides identification of said service object to perform said telephone service.

14. The computer-based telephone system of claim 12, wherein:

said control object invokes an object factory function on said service object identified by said database means.

15. The computer-based telephone system of claim 12, wherein:

said call information includes a telephone number corresponding to a destination of a telephone call.

16. A computer-based telephone system for providing various telephone services, comprising:

a processing unit;

memory operatively associated with said processing unit;

a plurality of service objects that are dynamically bound, each of said plurality of service objects defining a behavior corresponding to a telephone service; and system software stored in said memory, said system software cooperating with said processing unit in performing telephone services and including a control object, said control object determining call information pertaining to an incoming telephone call to said computer-based telephone system and requesting an identification of at least one of the service objects to perform a telephone service to the caller of the incoming call, based upon the call information.

17. A computer program product including a computer readable medium having computer readable program code means embodied thereon, for a computer-based telephone system for providing telephone services to incoming callers thereto, said computer program product comprising instructions for:

determining call information pertaining to an incoming telephone call;

querying a configuration database for and receiving therefrom an identification of a library having a plurality of service objects including an appropriate service object to perform a telephone service to a caller of the incoming telephone call, based upon the call information;

receiving from the library an identification of the appropriate service object within the library;

receiving the appropriate service object from the library, the appropriate service object defining a behavior of the telephone service to be performed for the caller of the incoming telephone call; and executing said appropriate service object.

18. The computer program product of claim 17, wherein:

said call information includes an identification of said incoming telephone call.

19. The computer program product of claim 17, wherein:

said call information includes an identification of the telephone number called by the caller of said incoming telephone call.

20. The computer program product of claim 17, wherein:

said call information includes identification of the time the incoming telephone call was received by said computer-based telephone system.

21. The computer program product of claim 17, wherein at least some of said instructions form a control object and said appropriate service object is adapted to inherit characteristics of said control object.

22. The computer program product of claim 17, wherein said control object, said service objects and said configuration database form a dynamically bound object-oriented system.

23. The computer program product of claim 17, wherein the instruction for querying the configuration database queries the configuration database for the identification of the library having the appropriate service object from a plurality of libraries of service objects.

24. A method of performing a telephone service for a telephone caller, said method comprising the steps of:

determining call information pertaining to an incoming telephone call;

querying a configuration database for and receiving therefrom an identification of a library having a plurality of service objects including an appropriate service object to perform the telephone service to the telephone caller of the incoming telephone call, based upon the call information;

receiving from the library an identification of the appropriate service object within the library;

receiving the appropriate service object from the library, the appropriate service object defining a behavior of the telephone service to be performed for the caller of the incoming telephone call; and executing said appropriate service object.

25. The method of claim 24, further comprising:

performing an object factory function on said library to receive the identification of the appropriate service object.

26. The method of claim 24, further comprising:

loading said library; and operating on said library to receive said appropriate service object.

27. A computer-based telephone system for providing various telephone services, said computer-based telephone system comprising:

a processing unit;

a memory operatively associated with said processing unit;

a plurality of libraries stored in said memory, each library having one or more service objects therein, each said service object defining a behavior of a telephone service;

a configuration database, stored in said memory, having information relating to the plurality of libraries; and system software stored in said memory, said system software cooperating with said processing unit in performing telephone services, including a control object, said system software determining call information pertaining to a telephone caller, querying the configuration database for and receiving therefrom an identification of the library having the appropriate service object to perform the telephone service for the telephone caller, based upon the call information, receiving from the identified library an identification of the appropriate service object within the library, receiving the appropriate service object from the identified library, the appropriate service object defining a behavior of the service to be performed for the telephone caller, and executing said appropriate service object.

28. The computer-based telephone system of claim 27, wherein:

said configuration database further provides an identification of said appropriate service object to perform the telephone service.

29. The computer-based telephone system of claim 27, wherein:

said control object invokes an object factory function on said appropriate service object identified by said configuration database.

30. The computer-based telephone system of claim 27, wherein:

said call information includes a telephone number corresponding to the telephone caller.

31. The computer-based telephone system of claim 27, wherein:

said one or more service objects are dynamically bound.

32. A computer program product including a computer readable medium having computer readable program code means embodied thereon, for a computer-based telephone system for updating telephone services performed by the computer-based telephone system to incoming callers, said computer program product comprising instructions for:

defining a new service object corresponding to a new service to be selectively performed by the computer-based telephone system;

adding the new service object to a library of service objects maintained by the computer-based telephone system, said new service object defining a behavior of the new service object to be selectively performed; and updating a configuration table associated with the library and maintained by the computer-based telephone system, to reflect the new service object being in the library, the configuration table identifying the library from a plurality of libraries having service objects.

33. The computer program product of claim 32, wherein the library to which the new service object is added is an existing library containing existing service objects.

34. The computer program product of claim 32, wherein the library to which the new service object is added is a dynamic link library.

35. In a computer-based telephone system, a method for updating telephone services performed by the computer-based telephone system to incoming callers, said method characterized by including:

defining a new service object corresponding to a new service to be selectively performed by the computer-based telephone system;

adding the new service object to a library of service objects maintained by the computer-based telephone system, said new service object defining a behavior of the new service to be selectively performed; and updating a configuration table associated with the library and maintained by the computer-based telephone system, to reflect the new service object being in the library, the configuration table identifying the library from a plurality of libraries having service objects.

36. The method of claim 35, wherein the library to which the new service object is added is an existing library containing existing service objects.

37. The method of claim 35, wherein the library to which the new service object is added is a dynamic link library.

* * * * *